(12) United States Patent
Zilka

(10) Patent No.: US 12,142,100 B2
(45) Date of Patent: *Nov. 12, 2024

(54) PREFERENCE-BASED HOME ENVIRONMENT CONTROL SYSTEM

(71) Applicant: Azure Katherine Zilka, Los Gatos, CA (US)

(72) Inventor: Azure Katherine Zilka, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,280

(22) Filed: Oct. 6, 2023

(65) Prior Publication Data

US 2024/0038009 A1 Feb. 1, 2024

Related U.S. Application Data

(63) Continuation of application No. 17/204,601, filed on Mar. 17, 2021, now Pat. No. 11,798,338, which is a continuation of application No. 16/679,191, filed on Nov. 9, 2019, now Pat. No. 11,004,284.

(51) Int. Cl.
    G07C 9/25      (2020.01)
    G06V 40/16     (2022.01)
    G07C 9/00      (2020.01)

(52) U.S. Cl.
    CPC .......... G07C 9/257 (2020.01); G06V 40/172 (2022.01); G07C 9/00571 (2013.01)

(58) Field of Classification Search
    CPC ............ G07C 9/257; G07C 9/00571; G07C 2209/04; G07C 9/00563; G07C 9/00904; G06V 40/172; H04L 12/2816; H04L 12/2818; G06F 3/165; G06F 16/639; G06F 3/167; H04W 4/029; H04H 60/46

See application file for complete search history.

(56) References Cited

U.S. PATENT DOCUMENTS

| | | | |
|---|---|---|---|
| 5,529,172 A | 6/1996 | Laughlin | |
| 6,754,504 B1 * | 6/2004 | Reed | G06Q 50/00 455/418 |
| 9,197,867 B1 * | 11/2015 | Scalisi | H04N 7/186 |
| 9,396,598 B2 | 7/2016 | Daniel-Wayman et al. | |
| 9,426,432 B2 * | 8/2016 | Scalisi | G06V 40/172 |
| 9,667,726 B2 * | 5/2017 | Basir | H04L 67/12 |
| 10,657,782 B2 * | 5/2020 | Bradley | G07C 9/00563 |
| 10,713,873 B1 * | 7/2020 | Winegar | H04W 12/61 |
| 2006/0063517 A1 * | 3/2006 | Oh | H04M 3/42348 379/159 |
| 2008/0246587 A1 * | 10/2008 | Fisher | E05B 19/0005 340/5.73 |
| 2010/0195810 A1 * | 8/2010 | Mota | H04N 7/186 379/167.12 |
| 2010/0207723 A1 * | 8/2010 | Cao | G07C 9/00309 340/5.61 |

(Continued)

OTHER PUBLICATIONS

Website, Ring Homepage, available at www.ring.com, visited Nov. 8, 2019.

*Primary Examiner* — Khalid M Almaghayreh

(57) ABSTRACT

A system is provided for utilizing received weather information, guest temperature preference information, and music preference information, for 1) outputting, via a speaker, an audible notification that indicates an action to take in view of current weather, 2) setting a temperature, and 3) selecting music to play via a speaker.

7 Claims, 3 Drawing Sheets

(56) References Cited

U.S. PATENT DOCUMENTS

| | | | |
|---|---|---|---|
| 2012/0136689 A1* | 5/2012 | Ickman | G06Q 50/01 705/7.19 |
| 2013/0219417 A1* | 8/2013 | Gilson | H04N 21/44218 725/12 |
| 2014/0277735 A1* | 9/2014 | Breazeal | B25J 9/0003 700/259 |
| 2016/0217397 A1 | 7/2016 | Peters et al. | |
| 2016/0227408 A1 | 8/2016 | Sherin | |
| 2016/0231718 A1* | 8/2016 | Logan | G05B 15/02 |
| 2017/0093594 A1* | 3/2017 | Peak | G05B 15/02 |
| 2017/0108235 A1* | 4/2017 | Guan | H05B 47/105 |
| 2017/0109983 A1* | 4/2017 | Flint | G08B 13/1672 |
| 2017/0193720 A1 | 7/2017 | Eyring et al. | |
| 2017/0316626 A1* | 11/2017 | Smith | G06F 21/36 |
| 2018/0005495 A1* | 1/2018 | Hieb | H04L 12/2825 |
| 2018/0018509 A1* | 1/2018 | Zhang | G01H 17/00 |
| 2018/0066863 A1* | 3/2018 | Hatch | H04W 4/02 |
| 2018/0068506 A1* | 3/2018 | Lee | G07C 9/257 |
| 2018/0174384 A1 | 6/2018 | Chiu | |
| 2018/0183806 A1 | 6/2018 | Nambisan et al. | |
| 2018/0191930 A1* | 7/2018 | Jeong | H04N 23/51 |
| 2018/0193589 A1* | 7/2018 | McLaughlin | G06F 3/016 |
| 2018/0248972 A1* | 8/2018 | Ahuja | H04L 67/125 |
| 2018/0283049 A1* | 10/2018 | Shiner | G07C 9/00309 |
| 2019/0159003 A1 | 5/2019 | Padgett et al. | |
| 2019/0206160 A1* | 7/2019 | Daniel-Wayman | G07C 9/21 |
| 2019/0213817 A1* | 7/2019 | Wechsler | G07C 9/00563 |
| 2019/0310820 A1* | 10/2019 | Bates | G06F 9/44505 |
| 2019/0342112 A1* | 11/2019 | Li | H04L 12/281 |
| 2020/0064456 A1* | 2/2020 | Xu | G01S 13/765 |
| 2020/0120202 A1* | 4/2020 | Jakobsson | H04L 63/105 |
| 2020/0204393 A1* | 6/2020 | Vashisht | H04L 67/12 |
| 2020/0275266 A1* | 8/2020 | Jakobsson | H04W 4/90 |
| 2020/0394332 A1* | 12/2020 | Jakobsson | G06F 16/24573 |

* cited by examiner

PREFERENCE-BASED HOME ENVIRONMENT CONTROL SYSTEM

RELATED APPLICATIONS

The present application is a continuation of, and claims priority to U.S. patent application Ser. No. 17/204,601, titled "SMART HOME SYSTEM, METHOD, AND COMPUTER PROGRAM," filed Mar. 17, 2021, which in turn is a continuation of, and claims priority to U.S. patent application Ser. No. 16/679,191, titled "SMART HOME SYSTEM, METHOD, AND COMPUTER PROGRAM," filed Nov. 9, 2019, which are all herein incorporated by reference in its entirety for all purposes.

FIELD OF THE INVENTION

The present invention relates to home systems, and more particularly to smart home systems.

BACKGROUND

Presently, smart home systems provide a variety of functions, such as alerting a user when a guest is at the door. Additionally, some smart home systems capture a photograph of the guest. However, there is very little functionality for tailoring a guest's visit. There is a need for addressing these and/or other issues with the prior art.

SUMMARY

A smart home system is provided. As a result of detecting input, an identity of a guest is determined. At least one operation is then performed, based on the identity of the guest.

DETAILED DESCRIPTION

Figure 1:
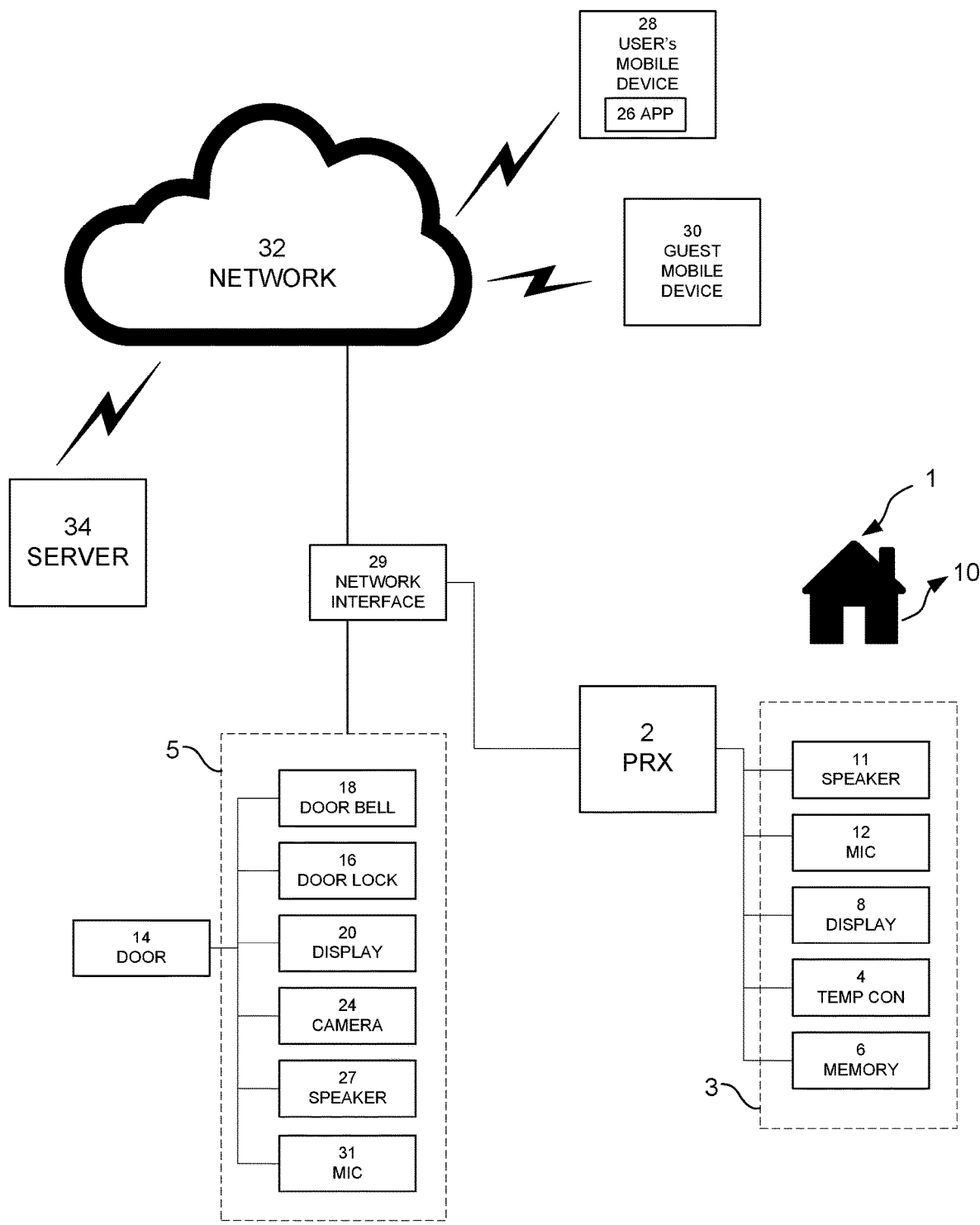
FIG. 1 illustrates a smart building system, in accordance with one embodiment.

FIG. 1 illustrates a smart building system 1, in accordance with one embodiment. As shown in FIG. 1, a smart building system 1 is provided including a building 10 with a processor 2 connected to an internal assembly 3 located inside the building 10 and an external assembly 5 all located outside the building 10. The internal assembly 3 includes an internal speaker 11, an internal microphone 12, an internal display 8, a temperature control 4, and memory 6 connected, as shown. The external assembly 5 includes a door 14, a doorbell 18, a door lock 16, an external display 20, a camera 24, an external speaker 22, and a microphone 26 all located outside the building 10.

As also shown in FIG. 1, the processor 2 is connected to a network interface 27, which is connected to a network 32 which, in turn, is connected to a user mobile device 28 including a smart home application 26, a guest mobile device 30, and at least one server 34.

Figure 2A:
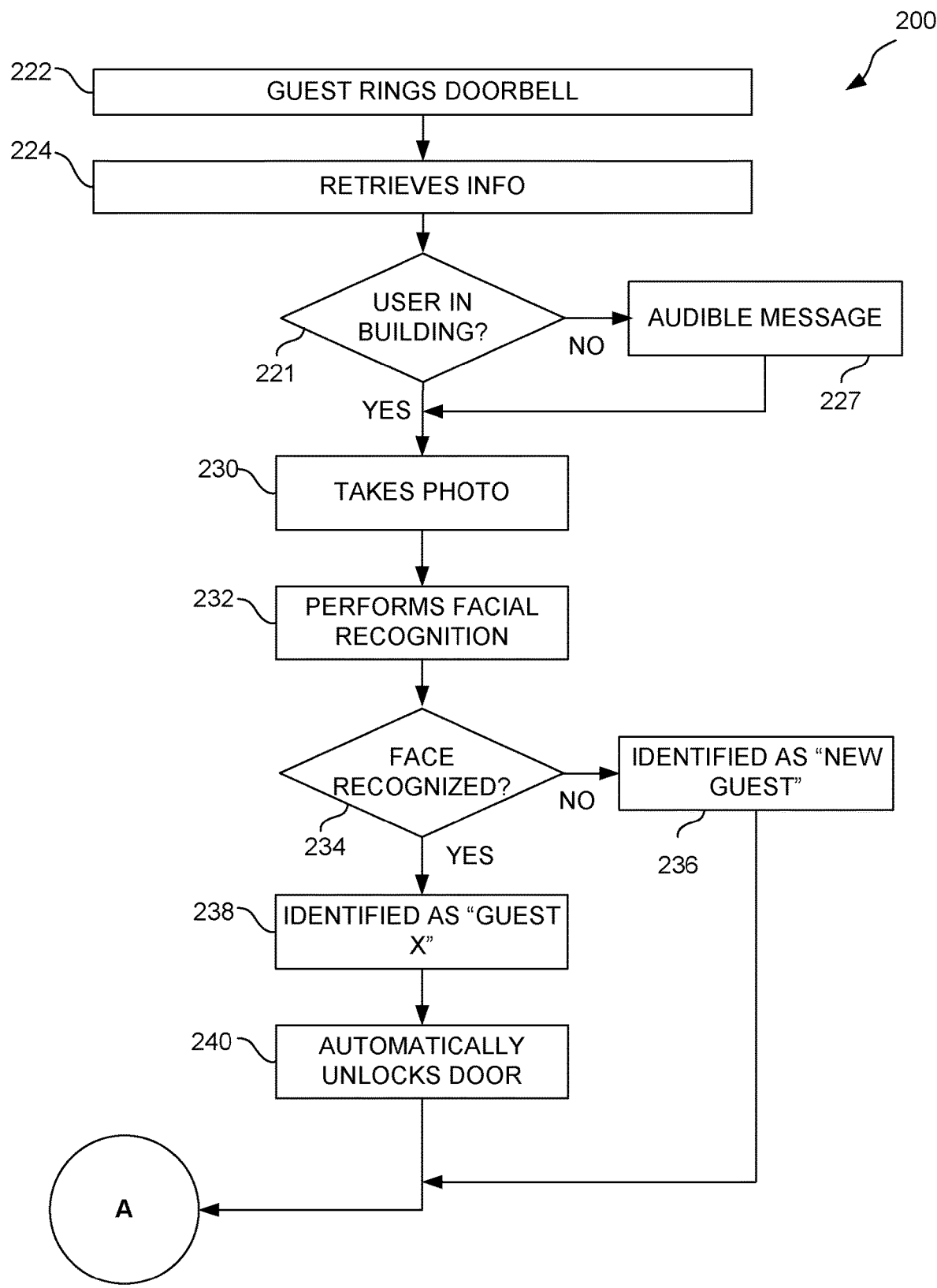
FIGS. 2A-2B illustrate a method for operating the smart building system, in accordance with one embodiment.
Figure 2B:
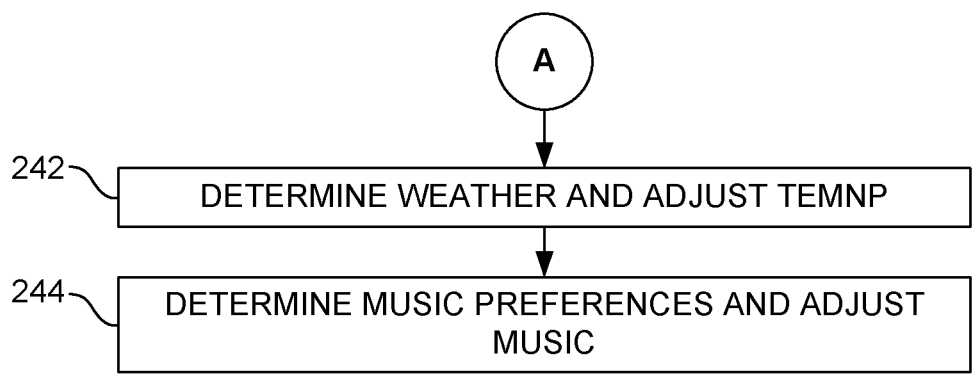

FIGS. 2A-2B illustrate a method 200 for operating the smart building system 1, in accordance with one embodiment.

In operation 222, a guest presses the doorbell 18. This causes a signal to be sent to the internal speaker 12 in order to make a noise (e.g. door bell sound). As an option, the building system 1 identifies a time that the guest rang the doorbell 18 in operation 222.

In operation 224, information is retrieved from multiple applications that are running on the user mobile device 28, the guest mobile device 30, the smart building system 1, and/or at least one server 34 which may be associated with any of the applications.

In one embodiment, at least one of the applications may include a photos application. An example of this may be GOOGLE™ photos and/or APPLE™ photos. In one embodiment, the photos application may use facial recognition to identify a person's face and a name associated with each photograph. This feature is used later, for categorizing the guest's face in a temporary or permanent category and/or identifying a name associated with a face recognized in a photograph.

In another embodiment, at least one of the applications may include a calendar application. This might include GOOGLE™ calendar, Appointment plus, etc. The calendar application may be used to determine appointments/events, and determine when the user is expecting a certain guest. The calendar application may also be used later to determine where the user and/or guest(s) is expected to be at certain dates/times, and who is to accompany the same.

In yet another embodiment, at least one of the applications may include a social media and contact information application. This may include FACEBOOK™, and INSTAGRAM™. These social media and contact information application may be used to identify "likes" and other preferences of various guests (in addition to those of the user). As will be described later, these preferences may be used to tailor an experience of the guest when the guest is visiting the building 10.

In still yet another embodiment, at least one of the applications may include a weather application. This may include applications like GOOGLE™ weather. The weather application can be used to identify the current temperature and a weather forecast for the day, for tailoring a guest and/or user experience in the building 10 based on such information.

In still yet another embodiment, at least one of the applications may include a location tracking application. This application may be used to track a current location of the user and/or guest by tracking a location of their mobile device, for reasons that will be described later.

In decision 221, it is determined whether the user is in the building 10. This may be accomplished in many different ways.

In one embodiment, it may be determined whether the user is in building 10 by tracking the location of the user mobile device 28. Such location of the user mobile device 28 may be compared to the location of the building 10. If they are the same, it may be determined that the user is in the building 10.

Another possible way to determine whether the user is in the building 10 can include checking the user's calendar information downloaded in operation 224, for any scheduled plans, involving going out of the building 10 or going to a different place. If the calendar information indicates that the user has an appointment at a location different from the location of the building 10, it may be determined in decision 221 that user is not at building 10. If the calendar information indicates that the user has something planned at the building 10, it may be determined in decision 221 that user is at the building 10.

In any case, if it is determined in decision 221 that the user is not in the building 10, the external speaker 38 outputs (not shown) an audible message that indicates that the user is not in building 10. For example, the external speaker 38 may output "user is not in building 10 right now, please come back later." See operation 227.

If it is determined in decision 221 that the user is in building 10, then, in operation 230, the external interface camera 24 captures a clear photo of the guest's face. For example, if Claire rings the doorbell, the camera 24 takes a clear photo of Claire's face in response to the doorbell 18 being rung.

In one embodiment, operation 222 and any one more subsequent operations may be performed even if the user is not determined to be in in the building 10 in decision 221. This may be beneficial for security reasons. For example, if the user is not in their building 10, and a thief breaks in, the camera may have a picture of the thief sent to the user's device 28 to show to the police.

In another embodiment, the external camera 24 can also take a clear photo of the guest's face before she rings the doorbell 18, like in response to her movement being sensed or when a face is recognized. Optionally, the user can decide when the photo was taken using a settings interface of the smart building 10. This setting can help for security when the user is not in the building 10 or attentive. When the third party shows up at the door and there is more than one person, the camera 24 may take a photo that captures every guest's face, using a panorama camera feature of the camera 24.

In operation 232, facial recognition is performed on the one or more guest photos taken in operation 230. For example, in one embodiment, the guest photos taken in operation 230 can be analyzed and compared with the information downloaded in operation 224 to determine whether the guest's face matches any face in photos managed by the photos application or any other application (e.g. photos, etc.) mentioned earlier. If there is a match, it may be determined, in decision 234, whether the recognized face in the photos managed by the photos application or any other application has been tagged or correlated with a name. If so, the building system 10 will know the name of the person that rang the doorbell 18.

In another embodiment, the guest photos taken in operation 230 can be analyzed and compared with the information downloaded in operation 224 to determine, in decision 234, whether the guest's face matches any face in photos managed by the contacts application. If there is a match, it may be determined which name is associated with the recognized face in the photo(s) managed by the contacts application. If so, the building system 10 will know the name of the person that rang the doorbell 18.

In yet another embodiment, the guest photos taken in operation 230 can be analyzed and compared with the information downloaded in operation 224 to determine, in decision 234, whether the guest's face matches any face in photos managed by the social media application. If there is a match, it may be determined, in decision 234, whether the recognized face in the photos managed by the social media application has been tagged or correlated with a name. If so, the building system 10 will know the name of the person that rang the doorbell 18.

If it is determined in decision 234 that the guest's face is not recognized, then, in operation 236, the unrecognized face is identified as a new guest with no match or name (e. a "new guest"). The unknown guest is then placed in an unknown category. At any time after the unknown guest is placed in the unknown category, the user can add or change the name of the new guest, so that the face is recognized and correlated with a particular known person.

In any case, if it is determined in decision 234 that the guest's face is not recognized, the processor 2 causes the internal speaker 11 to output a generic audible phrase that indicates a new guest has arrived. For example, the processor 2 may cause the internal speaker 11 to output the generic audible phrase "New Guest at the Door." Further, a visual notification may be sent to the internal display 8 or the user mobile device 28 to visually display "New Guest at the Door."

If, on the other hand, it is determined in decision 234 that the guest's face is recognized, then, in operation 238, in response to decision 234, the processor 2 causes the internal speaker 11 to output a specific audible phrase that indicates a particular specific guest has arrived. For example, the processor 2 may cause the internal speaker 11 to output the specific audible phrase "Claire is at the Door." Further, a visual notification may be sent to the internal display 8 and/or the user mobile device 28 using the smart home application 26. For example, such visual notification may read "Claire is at the Door." In one embodiment, the user may also customize the announcement for certain people, for example, "Bob is over for Tuesday dinner", using information from the calendar application.

In one embodiment, the user can set reminders for scheduled times for guests via the internal speaker 11 to output reminders for when the guest arrives. For example, if the office cleaners come on Saturday when it's everyone's day off, then a reminder is set on internal speaker 11, to clean the cubical and windows.

In operation 240, it is determined if it the automatic door lock 16 should be triggered to open the door 14. In one embodiment, this may be done based on a manual input by the user (e.g. using the user's mobile device 28, a manual switch (not shown) in the building 10, etc.).

In another embodiment, the automatic door lock 16 may be triggered based on whether a calendared event indicates that the identified guest is expected to attend the building 10, etc. For example, the processor 2 can determine whether Claire is expected for a calendared event by reviewing the calendar information from the calendar application retrieved in operation 224. Specifically, it may be determined whether there is a calendared event (e.g. Lunch, etc.) scheduled at the current time (or a predetermined or user selected time span before and/or after) at the building 10 and, if so, determine whether Claire is expected at such calendared event. If so, the processor 2 may either automatically open the door, or require additional security measures.

In another embodiment, a user of the building 10 may select either automatic entry or select an option to require a code before entry, in settings of the smart home application 26. When automatic entry is selected, the processor 2 causes the lock to open the door and the guest is welcomed in. For example if Kelly has to work at the office on Sunday, then her boss will set automatic entry for Kelly between 2:00 and 2:15. This automatically unlocking feature may only require the user to enter time, person, and date into their calendar. As an option, the internal speaker 11 may be used to remind the user a day before. In one embodiment, a new guest may be entered into calendar. If the new guest will be able to enter, the user may be required to insert the name and a picture of the new guest into smart home application 26.

On the other hand, if the user selects the option to require a code before entry, a code may be automatically generated by the processor 2 and be automatically sent to the guest mobile device 30 within a predetermined or user selected time span (e.g. 1 hour, 15 minutes, etc.) before a calendar event occurs. When the code is received at the mobile device of the guest 30, the guest may use the code to gain entry into the building 10 by unlocking the door. In one embodiment, this may be accomplished by the guest typing in the code on a virtual keypad of the display 20 of the building 10 and, if there is a match, then the processor 2 triggers the automatic door lock 16. In another embodiment, the guest may use a QR code to unlock the door 14, by the components of the external assembly 5 which verify the code and may or may not let the guest into the building 10, based on whether the code is correct or not. When the guest's code is correct, the processor 2 sends a message to the door lock 16, and the door lock 16 may be unlocked and the guest allowed into the building 10. The QR code or passcode may expire after an amount of time the user sets.

In one embodiment, the user may be reminded the day or week, etc. before the guest is allowed in, so the user is notified. The user can cancel/delete the QR code or passcode at any time.

In one embodiment, the guest may be late and the code expires. If so, the guest may request a new code from another one of the above mentioned messages sent to them (with the original code). Such request may be sent to the user, through the smart home application 26, so that the user has the option to accept it or not. If the request is accepted, the guest may be sent a new code and the guest may be able to use it to unlock the door. For example, if Emma is borrowing Sarah's house, while Sarah is on vacation for the night, and Emma arrives 20 minutes late due to traffic, Emma may request a late code. If Sarah accepts the request, Emma may be allowed into the building 10 using the new code.

With reference now to FIG. 2B, in operation 242, the weather is determined based on information gathered in operation 224. If the weather is determined to be rainy, the user is requested to wipe their shoes and the temperature is adjusted based on the weather outside. In one embodiment, the user is requested to wipe their shoes by the processor 2 sending a message to the external speaker 27 and internal speaker 11 so that the request is announced to the guest or user. The processor 2 may also send a message to the temperature control 4 to turn on the heat.

If the weather is determined to be hot, the user may be requested to stay hydrated and the temperature may be adjusted based on the weather outside. In one embodiment, the user may be requested to drink lots of water by the processor 2 sending a message to the external speaker 27 and internal speaker 11 so that the request is announced. The processor 2 may then send a message to the temperature control 4 to turn the air conditioning on.

Also in operation 242, the processor 2 may search the data retrieved in operation 224 (possibly from the guest's own smart home application, etc.) to identify the preferred temperature at which the guest keeps their own building. This information may be used to tailor the inside temperature of the building 10. For example, if the user prefers a temperatures of 85 degrees and the guest prefers a temperatures of 75 degree, an average may be calculated to keep the temperature at a level that accommodates both the guest and the user.

In one embodiment, once the guest's preferred temperature is identified in operation, the processor 2 may send a message to the temperature controller 4 and the temperature controller 4 may adjust the temperature to the preferred temperature. For example, if Joe lends Nell his beach house for the night, the temperature will automatically change to the guest's preferred temperature at their building 10. In one embodiment, where there are multiple guests, a preferred temperature may be identified for all of the guests and an average of some compromise temperature may be set.

Next, in operation 244, the processor 2 uses the guest's name (or other identifier) to look up the guest's own smart building profile and social media profile, using the corresponding applications discussed above. Thus, when a guest arrives, the processor 2 searches such data to identify the music that the guest enjoys (e.g. "likes"), etc. For example, the guest's favorite songs, station, podcasts, etc. (or recently listened to) may be identified.

Once the guest's preferred music is identified, the processor 2 may cause the music application to play the music identified using the internal speakers 11, and possibly play such music in the room where the guest is sensed using cameras or wireless connectivity with their mobile device. The music may be activated and start playing once the guest has entered the building 10. As another example, if the guest has listened to a country music streaming station recently, the processor 2 may find that station and play it for the guest.

In one embodiment, this may only occur if the music is already playing. Also, the guest or user can block this functionality from happening at any time if they prefer not to have music, etc. Still yet, in another embodiment, if there are more than one guest that is scheduled to arrive or have already been identified as having arrived, the processor 2 may search the profiles of all of such guests, and play a mixture of music, or a set of music that all of the guests prefer or have played recently.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In one embodiment, a system is provided, comprising: a bell switch; a camera; a speaker; a display; memory; one or more processors; and one or more programs, wherein the one or more programs are to be executed by the one or more processors, the one or more programs including instructions for: detecting user input of a guest; in response to detecting the user input, determining an identity of the guest; and performing at least one operation, based on the determined identity of the guest.

In one embodiment, the user input of the guest is detected utilizing the bell switch.

In one embodiment, the user input of the guest is detected utilizing the bell switch.

In one embodiment, the identity of the guest is determined based on information exchanged utilizing a network interface of the system.

In one embodiment, the identity of the guest is determined based on information exchanged utilizing a network interface of the system.

In one embodiment, the at least one operation is performed utilizing the speaker. As an option, the speaker includes an interior speaker configured to be installed inside an entity for which the system is installed. In another embodiment, the speaker includes an exterior speaker configured to be installed outside an entity for which the system is installed.

In one embodiment, the at least one operation is performed utilizing the display. As an option, the display includes an interior display configured to be installed inside an entity for which the system is installed. As another option, the display includes an exterior display configured to be installed outside an entity for which the system is installed.

In one embodiment, the one or more programs include instructions for: in response to detecting the user input, retrieving information that is associated with an application installed on a mobile phone; and the at least one operation is performed, based on the information.

In one embodiment, the application includes a calendar application.

In one embodiment, the application includes a weather application.

In another embodiment, a non-transitory computer readable storage medium is provided storing one or more programs, the one or more programs comprising instructions which, when executed by a system, cause the system to: detect user input of a guest; in response to detecting the user input, determine an identity of the guest; and perform at least one operation, based on the determined identity of the guest.

In another embodiment, the method, comprising: at a system: detecting user input of a guest; in response to detecting the user input, determining an identity of the guest; and performing at least one operation, based on the determined identity of the guest.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on"

and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system, comprising:
    a bell switch;
    a camera;
    a speaker;
    a display;
    memory;
    one or more processors in communication with the bell switch, the camera, the speaker, the display, and the memory; and
    one or more programs, wherein the one or more programs are to be executed by the one or more processors, the one or more programs including instructions for:
        detecting user input of a guest at a location;
        receiving calendar information from a calendar application; and
        in response to detecting the user input:
            determining an identity of the guest;
            utilizing the identity of the guest, determining that the guest is expected for a calendared event at the location by reviewing the calendar information from the calendar application;
            utilizing the determined identity of the guest and the determination that the guest is expected for the calendared event at the location by reviewing the calendar information from the calendar application, outputting, via the display, a visual notification that indicates:
                the identity of the guest, and
                a description of the calendared event; and
            utilizing the determined identity of the guest and the determination that the guest is expected for the calendared event at the location by reviewing the calendar information from the calendar application, outputting, via the speaker, an audible notification that indicates:
                the identity of the guest, and
                the description of the calendared event;
            receiving music information from a music application including guest music preference information associated with the guest;
            receiving weather information on a current weather from a weather application based on the location;
            receiving guest temperature preference information from a smart home application of the guest;
            utilizing the weather information, outputting, via the speaker, an audible notification that indicates an action to take in view of the current weather;
            utilizing the guest temperature preference information, setting a temperature at the location; and
            utilizing the music preference information, selecting music to play via the speaker.

2. The system of claim 1, wherein a code is automatically generated and automatically sent to a guest mobile device for use by the guest to unlock a door.

3. The system of claim 2, wherein the code automatically expires after a predetermined amount of time.

4. The system of claim 3, wherein, after the code automatically expires, a request is received from the guest mobile device of the guest, and, in response to the request, a new code is issued based on additional user input.

5. The system of claim 1, wherein the one or more programs include instructions for:
    determining whether an occupant of the location is currently at the location; and
    in response to detecting the user input and if it is determined that the occupant of the location is not currently at the location:
        outputting, via the speaker, an audible notification that indicates that the occupant of the location is not currently at the location.

6. A non-transitory computer readable storage medium storing one or more programs, the one or more programs comprising instructions which, when executed by a system, cause the system to:
    detect user input of a guest at a location;
    receive calendar information from a calendar application; and
    in response to detecting the user input:
        determine an identity of the guest;
        utilizing the identity of the guest, determine that the guest is expected for a calendared event at the location by reviewing the calendar information from the calendar application;
        utilizing the determined identity of the guest and the determination that the guest is expected for the calendared event at the location by reviewing the calendar information from the calendar application, output, via a display, a visual notification that indicates:
            the identity of the guest, and
            a description of the calendared event;
        utilizing the determined identity of the guest and the determination that the guest is expected for the calendared event at the location by reviewing the calendar information from the calendar application, output, via a speaker, an audible notification that indicates:
            the identity of the guest, and
            the description of the calendared event;
        utilizing the determined identity of the guest and the determination that the guest is expected for the calendared event at the location by reviewing the calendar information from the calendar application, outputting, via the speaker, an audible notification that indicates:
            the identity of the guest, and
            the description of the calendared event;
        receive music information from a music application including guest music preference information associated with the guest;

receive weather information on a current weather from a weather application based on the location;

receive guest temperature preference information from a smart home application of the guest;

utilizing the weather information, output, via the speaker, an audible notification that indicates an action to take in view of the current weather;

utilizing the guest temperature preference information, set a temperature at the location; and utilizing the music preference information, select music to play via the speaker.

7. A method, comprising:

at a system:

detecting user input of a guest at a location;

receiving calendar information from a calendar application; and in response to detecting the user input:

determining an identity of the guest;

utilizing the identity of the guest, determining that the guest is expected for a calendared event at the location by reviewing the calendar information from the calendar application;

utilizing the determined identity of the guest and the determination that the guest is expected for the calendared event at the location by reviewing the calendar information from the calendar application, outputting, via a display, a visual notification that indicates:

the identity of the guest, and a description of the calendared event;

utilizing the determined identity of the guest and the determination that the guest is expected for the calendared event at the location by reviewing the calendar information from the calendar application, outputting, via a speaker, an audible notification that indicates:

the identity of the guest, and the description of the calendared event;

utilizing the determined identity of the guest and the determination that the guest is expected for the calendared event at the location by reviewing the calendar information from the calendar application, outputting, via the speaker, an audible notification that indicates:

the identity of the guest, and the description of the calendared event;

receiving music information from a music application including guest music preference information associated with the guest;

receiving weather information on a current weather from a weather application based on the location;

receiving guest temperature preference information from a smart home application of the guest;

utilizing the weather information, outputting, via the speaker, an audible notification that indicates an action to take in view of the current weather;

utilizing the guest temperature preference information, setting a temperature at the location; and utilizing the music preference information, selecting music to play via the speaker.

* * * * *